United States Patent
Garbossa et al.

(10) Patent No.: US 8,497,714 B2
(45) Date of Patent: Jul. 30, 2013

(54) SYSTEM AND METHOD FOR DRIVING A SWITCH TRANSISTOR

(75) Inventors: Cristian Garbossa, Bressanone (IT); Andrea Vecchiato, Mirano (IT); Marco Flaibani, Padua (IT); Enrico Orietti, Pozzonovo (IT)

(73) Assignee: Infineon Technologies Austria AG, Villach (AT)

( * ) Notice: Subject to any disclaimer, the term of this patent is extended or adjusted under 35 U.S.C. 154(b) by 107 days.

(21) Appl. No.: 13/007,347

(22) Filed: Jan. 14, 2011

(65) Prior Publication Data

US 2012/0182049 A1  Jul. 19, 2012

(51) Int. Cl.
*H03K 3/00* (2006.01)
(52) U.S. Cl.
USPC .................................. 327/109; 327/108
(58) Field of Classification Search
USPC ................................................ 327/108, 110
See application file for complete search history.

(56) References Cited

U.S. PATENT DOCUMENTS

| | | | |
|---|---|---|---|
| 5,289,051 A | 2/1994 | Zitta | |
| 6,333,665 B1 * | 12/2001 | Ichikawa | 327/434 |
| 6,556,407 B2 * | 4/2003 | Brando et al. | 361/100 |
| 7,034,600 B2 * | 4/2006 | Scheikl | 327/376 |
| 7,408,398 B2 * | 8/2008 | Sander | 327/427 |
| 7,511,540 B2 * | 3/2009 | Dickman et al. | 327/108 |
| 2001/0040470 A1 * | 11/2001 | Brando et al. | 327/109 |

OTHER PUBLICATIONS

Balogh, L., "Design and Application Guide for High Speed MOSFET Gate Drive Circuits," pp. 1-37.

* cited by examiner

*Primary Examiner* — Ryan Jager
(74) *Attorney, Agent, or Firm* — Slater & Matsil, L.L.P.

(57) ABSTRACT

In an embodiment, a method of driving a switch transistor includes activating the switch transistor by charging a control node of the switch transistor at a first charging rate for a first time duration. After charging the control node of the switch transistor at the first charging rate, the control node of the switch transistor is further charged at a second charging rate until the control node of the switch transistor reaches a target signal level, where the second charging rate is less than the first charging rate.

51 Claims, 9 Drawing Sheets

SYSTEM AND METHOD FOR DRIVING A SWITCH TRANSISTOR

TECHNICAL FIELD

This invention relates generally to semiconductor devices and methods, and more particularly to a system and method of driving a switch transistor.

BACKGROUND

Power supply systems are pervasive in many electronic applications from computers to automobiles. Generally, voltages within a power supply system are produced by performing a DC-DC, a DC-AC, and/or an AC-DC conversion by operating a switch loaded with an inductor or transformer. DC-DC converters, such as buck converters, are used in systems that use multiple power supplies. For example, in an automotive system, a microcontroller that nominally operates at a 5V power supply voltage may use a buck converter to produce a local 5V power supply from the 12V car battery. Such a buck converter can be operated by driving an inductor using a high-side switching transistor coupled to a DC power supply. The output voltage of the buck converter can be controlled by varying the pulse-width of the time during which the switching transistor is in a conductive state.

In some buck converter implementations, the switching transistor is a discrete switching transistor driven by a switch driver integrated circuit, or is included on an integrated circuit that includes both the switch driver and the switching transistor. Because a high side driver is often referenced to a high voltage, some switch driver circuits use level shifters and bootstrap capacitors in order to drive the gate of the switching transistor with a voltage level sufficient to turn-on or turn-off the device.

Switching power supplies are generally more efficient than other power supply technologies, such as linear voltage regulators, but they are still prone to some inefficiencies. These inefficiencies can be caused by excess power consumed by switching power losses in the switching transistor, driving losses incurred while driving the switching transistor, and conductive losses.

SUMMARY OF THE INVENTION

In an embodiment, a method of driving a switch transistor includes activating the switch transistor by charging a control node of the switch transistor at a first charging rate for a first time duration. After charging the control node of the switch transistor at the first charging rate, the control node of the switch transistor is further charged at a second charging rate until the control node of the switch transistor reaches a target signal level, where the second charging rate is less than the first charging rate.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a waveform diagram showing the switching behavior of a MOS device during turn-on;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a system and method for driving a switch transistor in a switched-mode power supply. The invention may also be applied, however, to other types of circuits, for example, as switching circuits, and motor controllers.

In an embodiment, a switching transistor is driven by charging the gate of the switching transistor in two phases. The first charging phase is a fast charging phase in which the gate of the switching transistor is charged to a percentage of a final value. The second charging phase is a slower and more accurate charging phase in which the gate-source voltage of the switching transistor approaches the final value. By dividing the charging into two phases, the gate of the switching transistor can be charged both quickly and accurately. The fast charging in the first phase can reduce switching losses, and the accurate setting of the gate voltage in the second phase can reduces conductive losses by setting the gate-source voltage of the switching transistor such that the on resistance is kept low and the switching transistor is operating in a safe region. In some embodiments, a feedback loop can be used during the second phase.

Figure 1A:
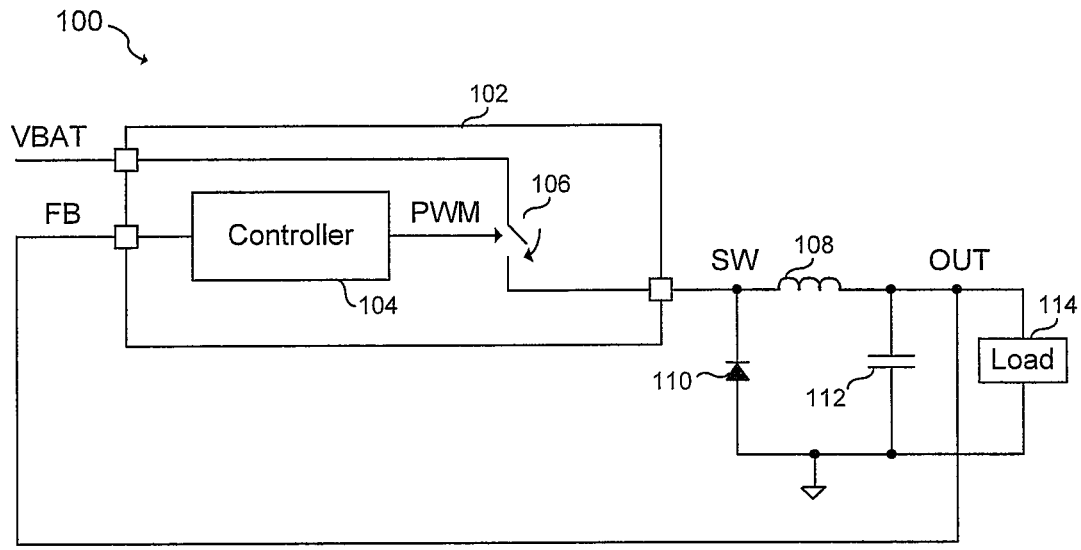
FIGS. 1a-1b illustrate block diagrams of embodiment power supply systems.

FIG. 1a illustrates embodiment power supply system 100, configured as a buck converter, which includes driver integrated circuit (IC) 102 coupled to diode 110 and inductor 108 at node SW. Driver integrated circuit 102 includes controller 104 and switch 106. During operation, controller 104 drives switch 106 with a pulse-width modulated (PWM) or a pulse frequency modulated (PFM) signal, thereby coupling and decoupling battery voltage VBAT to node SW. When switch 106 is ON, current flows from terminal VBAT though inductor 108 to charge capacitor 112 and/or to provide power to load 114. When switch 106 is off, current continues to flow through the inductor 108 via diode 110. In an embodiment, output node OUT is coupled to feedback input FB of IC 102. Controller 104 adjusts the pulse width of the PWM signal driving switch 106 according to the voltage detected at node OUT. By adjusting the pulsewidth of the PWM signal, the voltage at node OUT is regulated to a predetermined voltage. In some embodiments, controller 104 regulates the voltage at node OUT by adjusting the frequency and/or pulsewidth of a PFM signal.

In some embodiments, controller 104 generates a PWM signal during normal operation, and generates a PFM signal when load 114 requires a low current. Such a scenario can occur, for example, in embodiments where load 114 is a microcontroller or an other type of controller or system having various power control modes. For example, in some power modes, the microcontroller (or other digital system) may require a certain level of current during normal operation. In a sleep mode, however, the microcontroller may require a very small sleep mode or standby current until the microcontroller transitions into a normal mode. During these low current modes, in some embodiments, controller 104, generates a PFM signal at a frequency less than the nominal PWM signal in order to save power.

In one example embodiment, system 100 operates with a voltage at VBAT between about 5V and about 40V, and produces an output at node OUT at between about 4.5V and 5.5V to generate an output current between about 0 mA and about 600 mA. During normal operation, the PWM frequency is between about 1.5 MHz and about 3.0 Mhz. In one embodiment, the efficiency of system 100 is greater than about 75% at output currents between about 100 mA and about 600 mA. At small output loads, for example, 100 µA, the quiescent current used by system 100 is less than 30 µA. In alternative embodiments, different input and output voltage levels, output currents, operating conditions, efficiencies, and operating frequency ranges can be used.

Figure 1B:
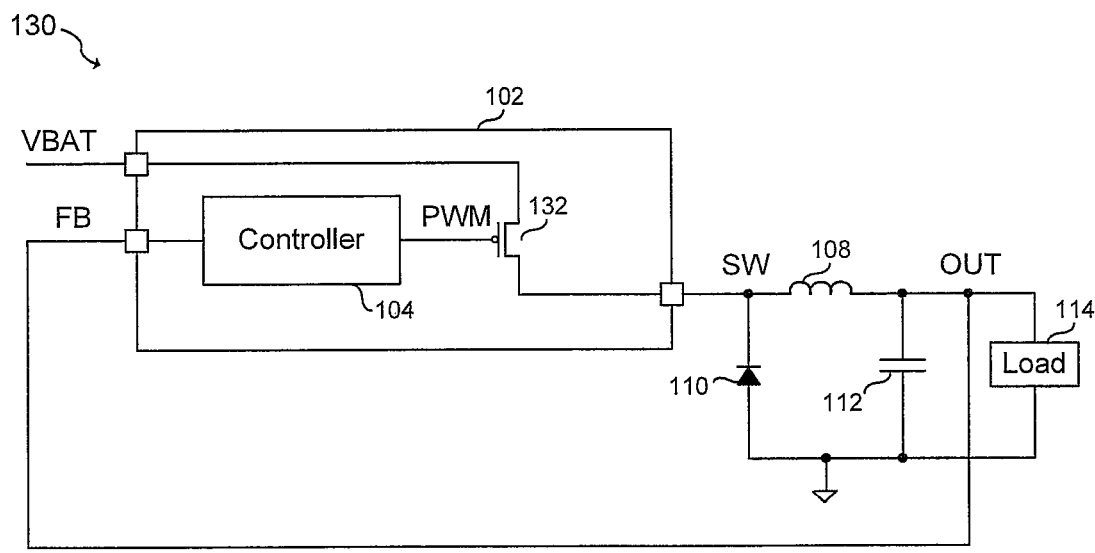

FIG. 1b illustrates embodiment power supply system 130, which is similar to power system 100 in FIG. 1b, but shows switch 106 as being implemented as PMOS device 132. In alternative embodiments, switch 106 can also be implemented using other technologies, including, but not limited to a JFET transistor, an NMOS transistor, or an IGBT. In the illustrated embodiment, by using an PMOS switch for a high-side driver, the drive signal at node PWM does not need to exceed the voltage at VBAT to turn off the switch or to maintain a 100% duty cycle. In embodiments using enhancement mode NMOS devices, a supply voltage higher than VBAT is used to turn on the NMOS device in order to couple node SW to the voltage potential at node VBAT. Furthermore, a continuously running charge pump may be needed to sustain the gate drive of the NMOS device in a high-side driver in order to produce a 100% duty cycle signal. It should be appreciated that alternative embodiments that use an NMOS device as a low-side switch (not shown), the drive signal of the NMOS device (i.e. PWM) does not need to exceed the negative supply voltage.

In some embodiments, for example, embodiments where the voltage of VBAT exceeds maximum device and breakdown ratings of IC 102, provisions are made to protect PMOS device 132 from damage and breakdown. In one embodiment, the maximum Vgs across the PMOS device is limited so as not to overstress the device. In some embodiments where switching losses are minimized, the gate of PMOS device of 132 is driven with a fast signal in order to minimize switching losses.

Figure 2:
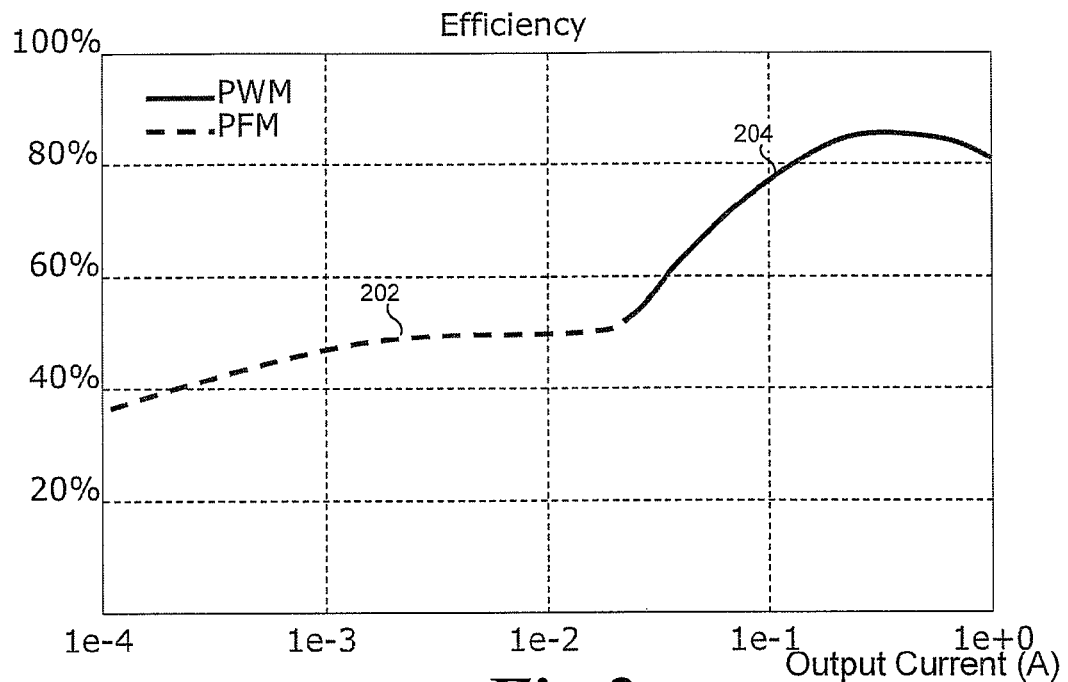
FIG. 2 illustrates an efficiency graph of an embodiment system.

FIG. 2 illustrates an efficiency graph for an embodiment system that operates with input voltage VBAT of about 12V, an output voltage of about 5V, a switching frequency of 2.2 MHz, and a switch-on and switch-off time less than 15 ns. These switching times correspond to an embodiment where a 75% efficiency is maintained for an output current of between about 100 mA and about 600 mA. In alternative embodiments, for example embodiments having different load currents and different efficiency requirements, different switching times can be used. Curve portion 202 represents efficiency with respect to output current for a case where controller 104 outputs a PFM signal, and curve portion 204 represents efficiency with respect to output current for a case where controller 104 outputs a PWM signal.

Figure 3:
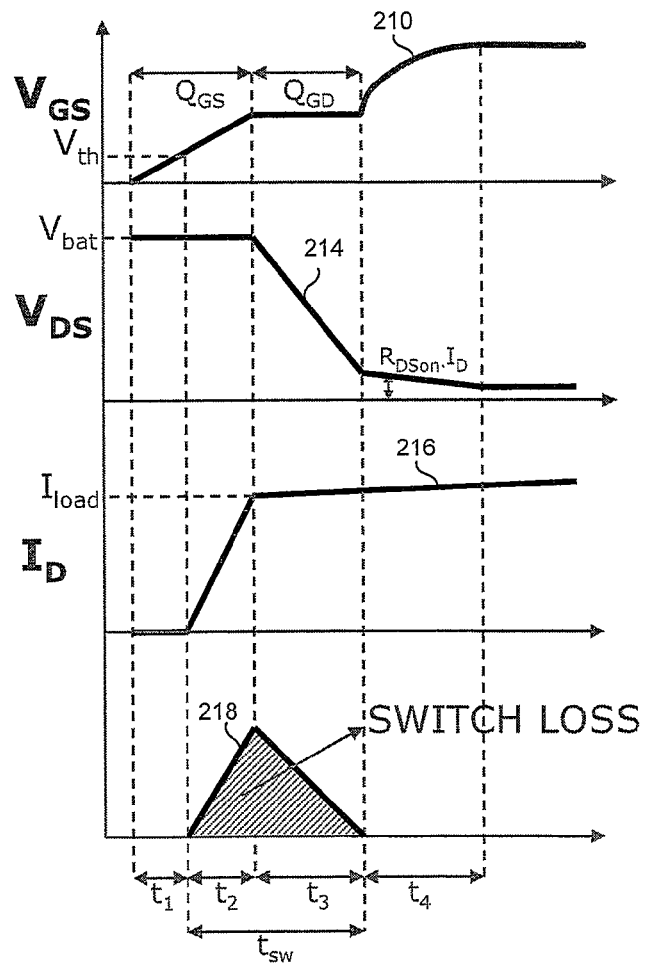

FIG. 3 illustrates a waveform diagram showing the switching behavior of a MOS device during turn-on. Curve 210 represents gate-source voltage $V_{GS}$ of the MOS device, curve 214 represents drain-source voltage $V_{DS}$ of the MOS device, and curve 216 represents drain current $I_D$ of the MOS device. During time period t1, the gate of the MOS device is charging, but $V_{GS}$ remains below threshold $V_{TH}$ of the MOS device. Therefore, drain current ID is zero or remains at a minimal value. During time period t2, when $V_{GS}$ exceeds threshold $V_{TH}$, drain current ID begins to increase. During time period t3, when the gate source capacitance is charged to $Q_{GS}$, voltage $V_{DS}$ is decreases, and the gate-drain capacitance is discharges. Time period t3 is also referred to as the Miller Plateau.

Time period t4 starts once the MOS transistor has entered the triode region and the gate-drain capacitance is discharged with charge $Q_{GD}$. Shaded region 218 represents the region of operation that incurs switching losses, which occurs during time periods t2 and t3. Here the MOS device dissipates a switching power loss of about $I_D V_{DS}$. In terms of the power supply system parameters:

$$P_{switch} = (V_{bat} I_{load})(t2+t3) f_{switch},$$

where $P_{switch}$ is the switching loss during the switch on phase, $V_{bat}$ is the input voltage of the voltage converter (battery voltage), $I_{load}$ is the load current, t2+t3 is the time period during which switching losses are incurred, and $f_{switch}$ is the switching frequency of the power supply. It should be noted that switching loss $P_{switch}$ is also incurred during the switch off phase. In addition, conductive power losses are incurred, and can be expressed with respect to the power supply system as $$P_{cond} \approx I^2_{load} R_{DSon} D,$$

where $P_{cond}$ is the conductive power loss, $R_{DSon}$ is the on resistance of the MOS device and D is the duty cycle of the power converter. Other power losses incurred by the system also include driver loss, which is the power expended by driving the gate capacitance of the MOS device, which can be represented as $$P_{driver} = C_{gate\_tot} V_{GS} V_{bat} f_{switch},$$

where $P_{driver}$ is the driver loss, and $C_{gate\_tot}$ is the total gate capacitance of the MOS device.

It can be seen from the above power dissipation equations that switching losses are proportional to switching time. Therefore, in some embodiments, the switching time is kept short in order to keep switching losses low. For example, a rise and fall time at the gate of the switching transistor is less than about 15 ns. In alternative embodiments, other switching times can be used depending on the particular embodiment and its specifications. In an embodiment, gate charging is performed with circuitry referenced from the low-side. In some embodiments, using low-side referenced circuitry avoids the need to use a large bootstrap cap to supply a high side driver that is referenced to a supply other than ground, for example, a supply coupled to the source of the high-side MOS switch. In such an embodiment, a small buffer cap is used in the high side to supply the high side logic that does not persistently consume DC current. In one embodiment, an internal buffer capacitor can be kept in the range of about 25 pF. In alternative embodiments, however, the MOS gate can be driven by a shifted supply.

In an embodiment, the maximum value of gate-source voltage $V_{GS}$ is controlled to be as high as possible without stressing an internal Zener protection diode (not shown) coupled between the gate and the source of the MOS device. By keeping $V_{GS}$ as high as possible, $R_{DSon}$ is made lower, thereby minimizing conductive power losses. If the internal Zener protection diode is stressed, however, reverse current though the diode can lead to higher power dissipation. In some embodiments that do not use Zener protection diodes, the gate-source voltage of the MOS device is kept below a maximum voltage by using other types of protection circuits, such as clamp circuits, or by using other means in order to avoid destruction and degradation of the device. In one embodiment that uses a 5.2V Zener protection diode, $V_{GS}$ is controlled to reach a final value of about 5V during normal operation. In alternative embodiments, other values can be used. In one embodiment, the MOS device is operated such that there is no current conduction in the driver during an off state in order to further reduce power dissipation.

In an embodiment, in order to charge the gate of the MOS device quickly and accurately, the gate of the MOS device is charged in two phases. The first phase is a fast switch-on phase that quickly brings $V_{GS}$ of the switching transistor about 70%-80% of its maximum value (just above the Miller Plateau). The second phase is a slower switch-on phase in which the slope of the drive signal is reduced to about one-fourth of the first phase value to more accurately approach the final $V_{GS}$ value. In one embodiment, a feedback loop is used during the second phase to more accurately charge the gate of the switching transistor to its final $V_{GS}$ value.

Figure 4:
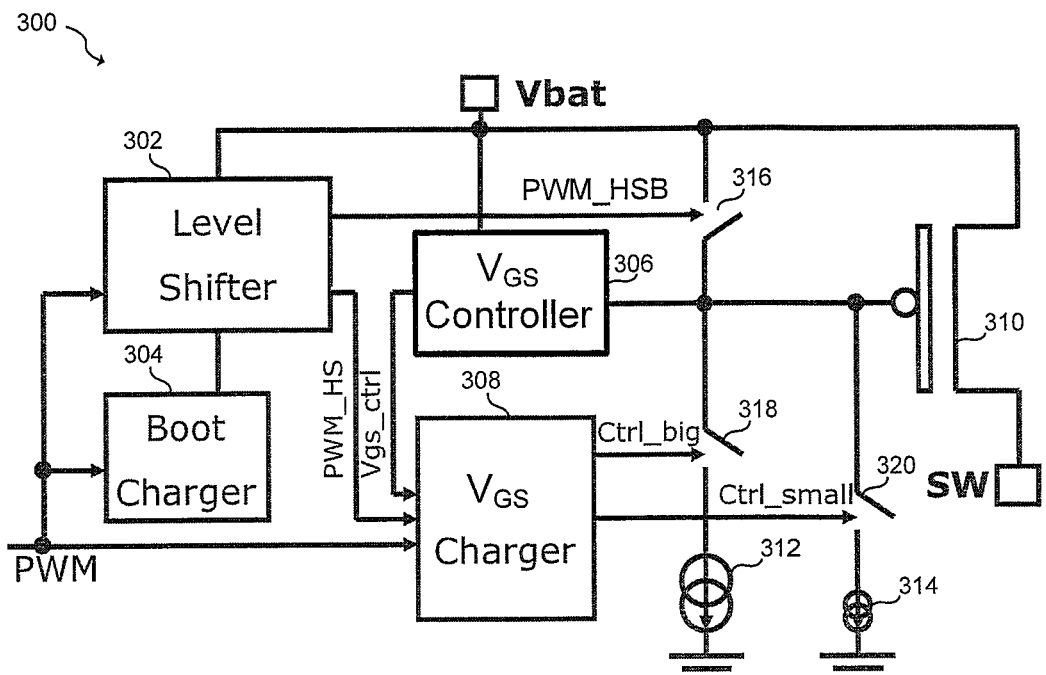
FIG. 4 illustrates an embodiment driver circuit.

FIG. 4 illustrates circuit 300 according to an embodiment of the present invention. Circuit 300 includes level shifter 302, boot charger 304, VGS controller 306, VGS charger 308, switching transistor 310, larger current source 312, and small current source 314. In an embodiment, level shifter 302 transfers switching information from a low side domain to a high side domain, and bootstrap charger 304 charges a buffer capacitor to supply level shifter 302 the requisite power to enable logic transitions the low side domain and the high side domain. In an embodiment, the buffer capacitor (not shown) has a small capacitance, because of the small current required by CMOS digital gates. In one embodiment, this small capacitance is about 25 pF, however, in alternative embodiments, other values can be used.

Circuit 300 also includes $V_{GS}$ controller 306 that monitors the status of the gate to source voltage of switching transistor 310, and $V_{GS}$ charger 308 that initiates and terminates the first switch-on phase according to information received from $V_{GS}$ controller. Current generators 312 and 314 charge the gate of switching transistor 310 during the first and second switch-on phases. In one embodiment, both current sources 312 and 314 charge the gate of switching transistor 310 during the first switch-on phase to bring the $V_{GS}$ of switching transistor 310 to about 70%-80% of its maximum value. During the second phase, large current source 312 is disabled, and small current source 314 charges the gate of switching transistor 310 to its final value. In an embodiment, the current of small current source 314 is about one-fourth the current of combined current sources 312 and 314. In an embodiment, current sources 312 and 314 are implemented using DMOS transistors. Alternatively, other transistors types including, but not limited to bipolar, NMOS can also be used. In alternative embodiments, other current ratios can be used, as well as other current source switching schemes. For example, in an embodiment, the current during the first phase can be supplied with a different current source from the current source used during the second phase. In a further embodiment, a single variable current source can be used for both phases. In further embodiments, other methods known in the art for supplying and switching currents can be used.

In an embodiment, level shifter 302, boot charger 304, VGS controller 306, VGS charger 308, switching transistor 310, switches 316 and 318, and current sources 312 and 314 are included on a single integrated circuit. In alternative embodiments, these blocks can be partitioned across multiple components.

Figure 5:
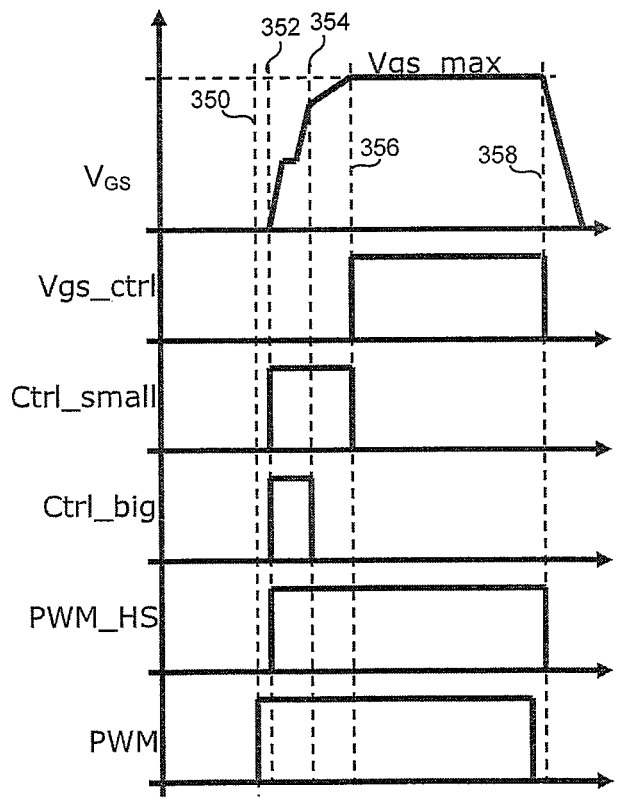
FIG. 5 illustrates a timing diagram of an embodiment driver circuit.

FIG. 5 illustrates a timing diagram showing the operation of the control signals of the embodiment of FIG. 4. When PWM signal goes high at time 350, $V_{GS}$ charger 308 is enabled causing signals Ctrl_small, Ctrl_big, and PWM_HS to become active at time 352. The delay from time 350 to time 352 is due to the delay in level shifter 302. Signal PWM_HS activates $V_{GS}$ charger 308 to produce control signals Ctrl_small and CTRL_big. Signal PWM_HSB is an inverted version of PWM_HS and shuts off switch 316 before switching transistor becomes active to avoid cross conduction. When switching transistor 310 is not active, switch 316 keeps switching transistor 310 is off by biasing its gate to Vbat. Signals Ctrl_small and Ctrl_big activate current sources 312 and 314 via switches 318 and 320. In alternative embodiments, current sources 318 and 320 can be activated using other techniques besides turning on a series switch using methods known in the art.

At time 352, the gate of switching transistor 310 begins to charge and $V_{GS}$ increases quickly at a first slope until time 354. At time 354, control signal Ctrl_big is de-asserted and shuts off switch 318 coupled to current source 312, thereby causing $V_{GS}$ to increase at a lower slope. At time 356, control signal Ctrl_small is de-asserted shutting off switch 320 coupled to current source 314 and control signal Vgs_ctrl is asserted. In an embodiment, the assertion of Vgs_ctrl indicates that the charging phase is finished. In some embodiments, the gate of switching transistor is controlled using a feedback loop starting at time 354. After the PWM signal becomes de-asserted, PWM_HS and Vgs_ctrl goes low at time 358, thereby causing switch 316 to discharge $V_{GS}$.

Figure 6:
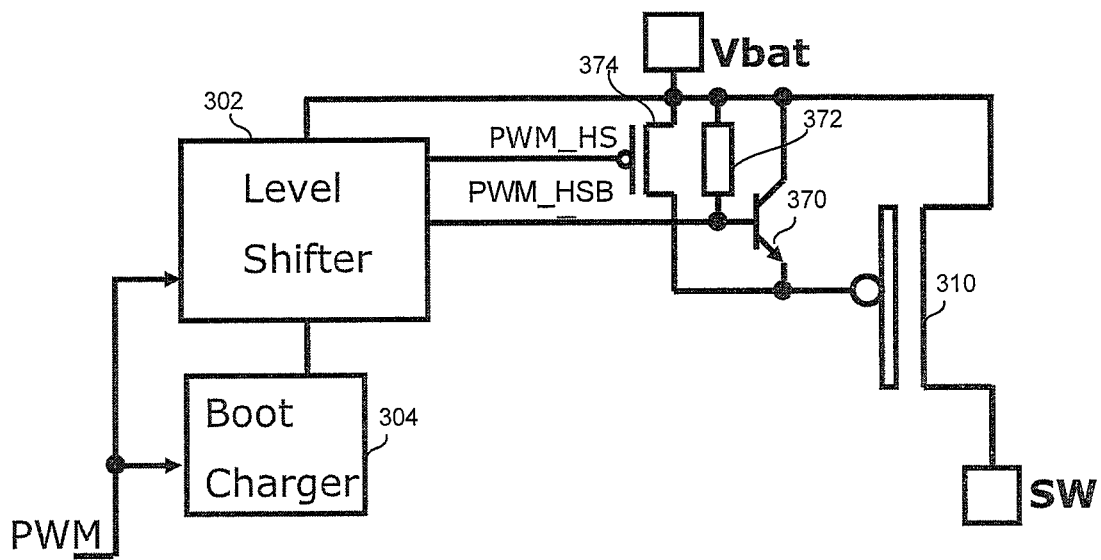
FIG. 6 illustrates an embodiment switch off phase.

FIG. 6 illustrates an embodiment shut-down circuit for switching transistor 310. In an embodiment, switching transistor 310 is shut off by pulling its gate to Vbat via PMOS device 374 and by NPN BJT device 370. By using NPN 370 in parallel with PMOS 374, the gate of switching transistor 310 can be pulled up quickly. Resistor 372 coupled between node Vbat and the base of NPN 370 prevents a spurious turn-on of switching the switching devices, for example, due to glitches that occur on the battery line or at the drain of the PMOS switch, generally due to noise. In such embodiments switch control can be maintained while the driver is disabled. In some embodiments, this operates similarly to a passive pull-up. In an embodiment, switch 316 in FIG. 4 can be implemented PMOS device 374, resistor 372 and BJT 370. Alternatively, other switch architectures can be used.

Figure 7A:
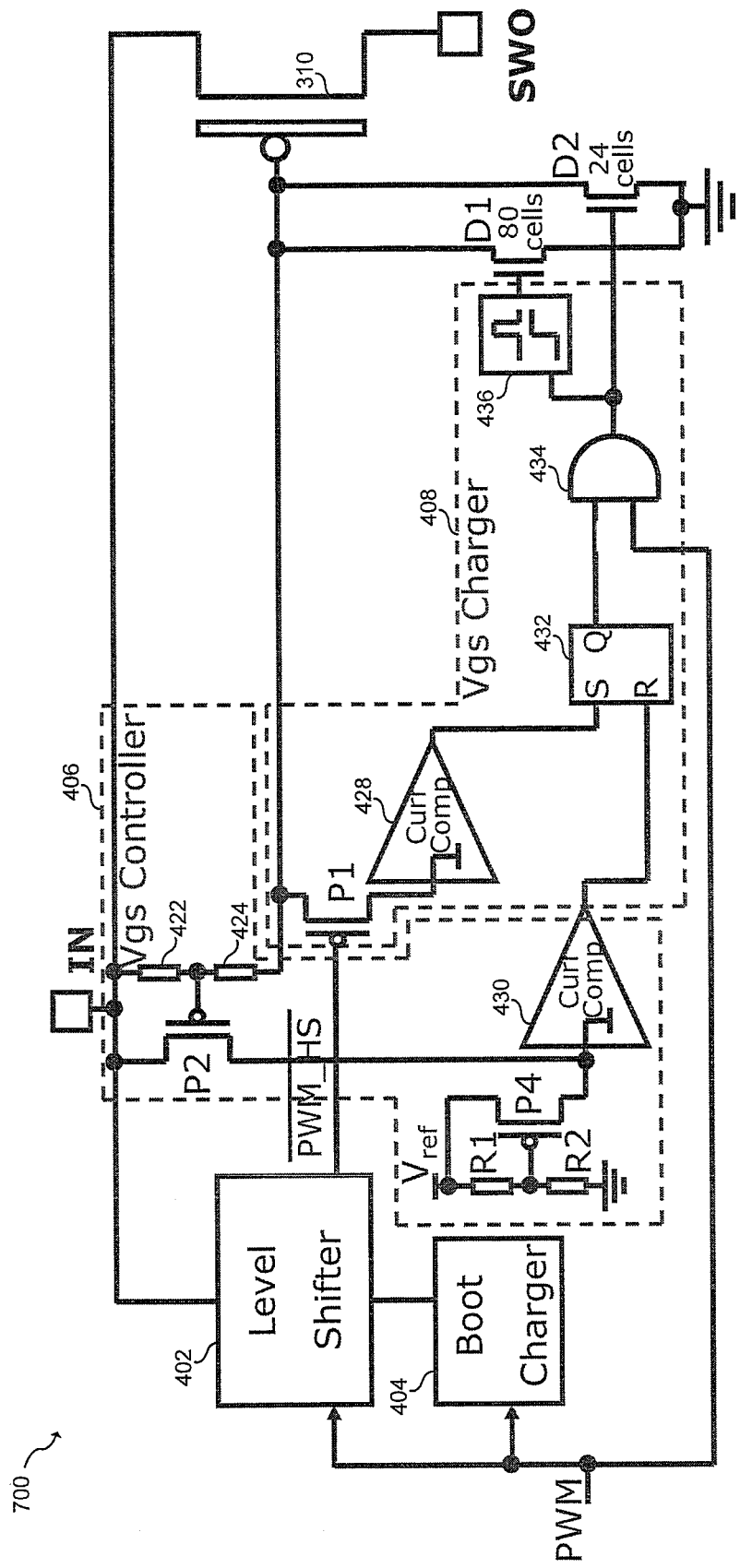
FIGS. 7a-7b illustrate embodiment driver circuits.

FIG. 7a illustrates embodiment circuit 700 related to the switch on phase of transistor 310. The circuit of FIG. 7a can be combined with the circuitry shown in FIG. 6 to provide a circuit that performs both the turn-on and turn-off of transistor 310. Circuit 700 has level shifter 402, boot charger 404, $V_{GS}$ Controller 406, $V_{GS}$ Charger 408, current source transistors D1 and D2 and switching transistor 310.

In an embodiment, $V_{GS}$ controller 406 has current comparator 430, PMOS P2 and a resistor divider made of resistors 422 and 424. This resistor divider also helps keep transistor 310 shut off during the switch-off phase. $V_{GS}$ charger 408 has PMOS P1, current comparator 428, latch 432, AND gate 434, and pulse generation block 436. In an embodiment, as soon as the PWM signal arrives in the high side logic domain and the circuit and the switch off circuit (See FIG. 6) is disabled, PMOS P1 conducts current pulling down the gate of switching transistor 310 PMOS, as well as the gate of PMOS P2, which also starts to conduct current. The current through transistor P1 is sensed by current comparator 428 and compared to a reference current generated in the low side power domain. Transistor P1 also acts as a source follower that clamps the gate voltage of switching transistor 310.

In an embodiment, when a current threshold set by a reference current produced by PMOS device P4 and resistors R1 and R2 is exceeded, latch 432 is set and current source transistors D1 and D2 are activated, thereby charging the gate of switching transistor 310. In alternative embodiments, the reference current can be produced using other circuits and techniques known in the art. In an embodiment, current source transistor D1 is a large device that conducts more current than current source transistor D2. In one embodiment, transistors D1 and D2 are DMOS devices that are made of unit transistor cell. Transistor D1 is made of 80 unit transistor cells, and transistor D2 is made of 24 unit transistor cell. In alternative embodiments, other device types, other numbers of unit cells, and other current scaling methods can be used depending on the application and its requirements. After a period of time determined by pulse generation block 436, transistor D1 is shut off, and transistor D2 remains conducting. In an embodiment, comparator 430 compares the drain current of PMOS P2 with a reference current generated in the low-side power domain. Quadratic behavior of current variation of P2, helps to create a fast overdrive for the current comparator and, at the end, makes the controller faster in some embodiments. Once the reference current has been exceeded, latch 432 is reset and transistor D2 is shut off. It should be appreciated that the logical structures shown in Vgs Charger 408 of FIG. 7a is an example embodiment. In alternative embodiments, other logic structures that are functionally similar and/or functionally equivalent to the logic shown in FIG. 7a can be used.

Figure 7B:
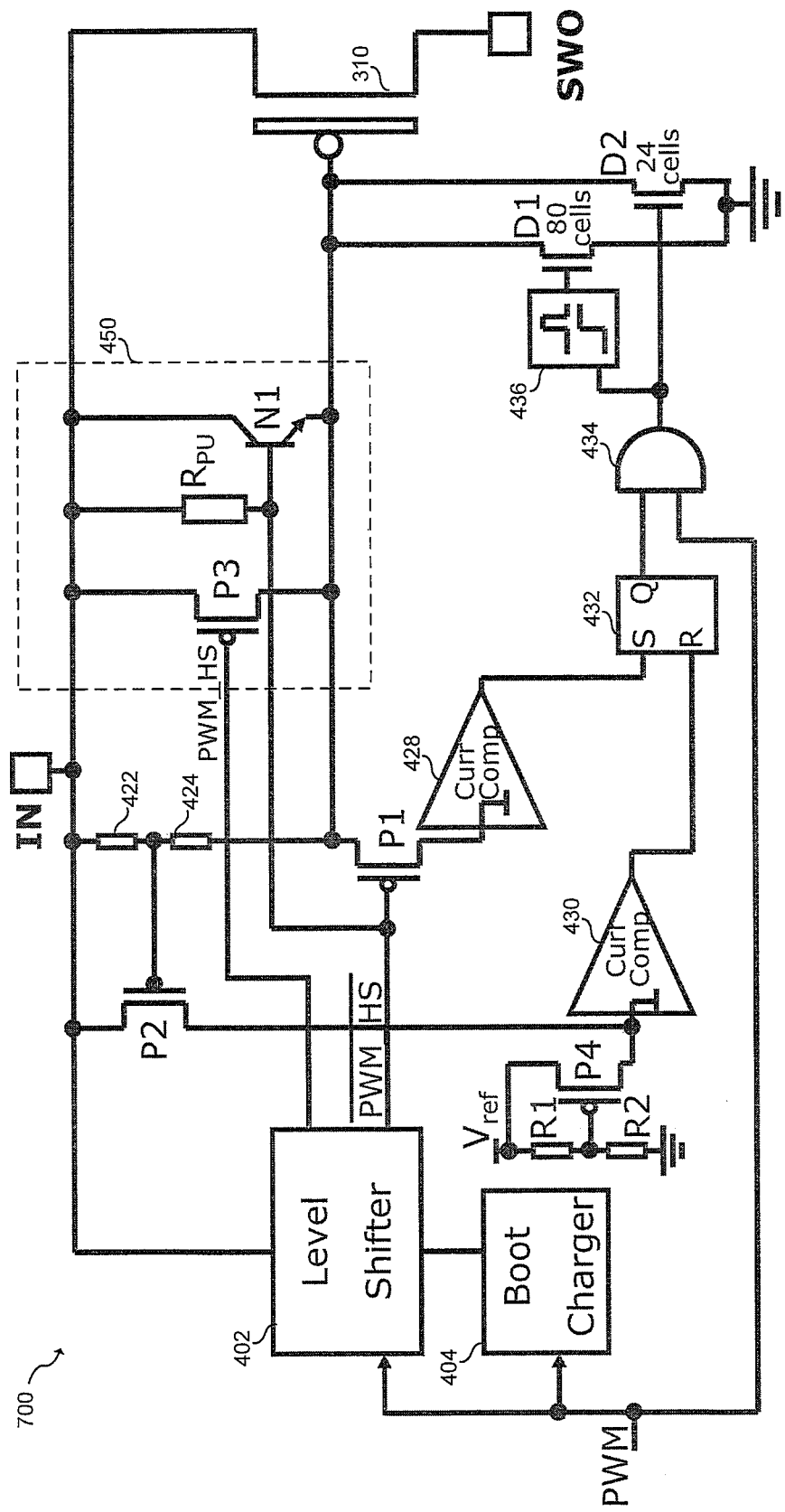

FIG. 7b illustrates an embodiment driver circuit schematic showing the switch on phase circuitry of FIG. 7a, as well as switch off phase circuitry 450. Switch off phase circuitry, which includes PMOS device P2, NPN device N1, and pull-up resistor $R_{PU}$, operates as described herein with respect to FIG. 6.

Figure 8:
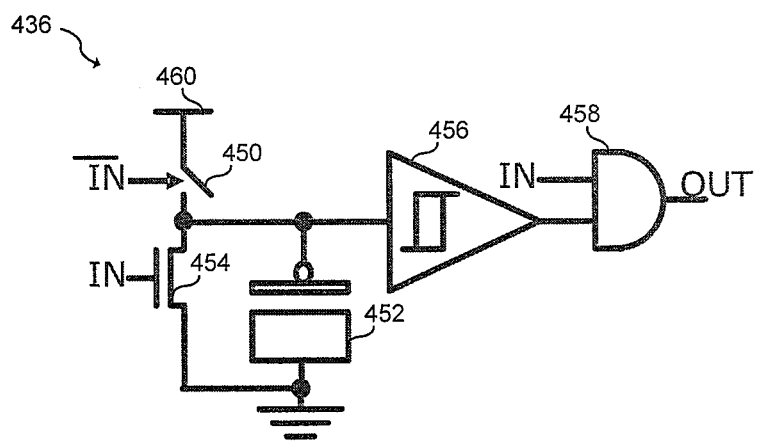
FIG. 8 illustrates an embodiment pulse generation block.

FIG. 8 illustrates an example embodiment of pulse generation block 436 of FIG. 7a. Pulse generation block has switch 450, transistor 454, gate capacitor 452, Schmidt trigger 456 and gate 458. In an embodiment, the structure of pulse generation block 436 matches the power PMOS gate capacitance and the transconductance (gm) of the switch DMOS, thereby allowing for a type of "open loop control" of the fast charging phase. For example, in one embodiment, device 454 and capacitance 452 has a similar gm/c ratio as the switch DMOS and the power PMOS gate capacitance. When input IN goes high, the output of AND gate 458 goes high and capacitor 452 begins to discharge. When the threshold of Schmidt trigger 456 is crossed, the output of Schmidt trigger 456 goes low, thereby causing the output of AND gate 458 to go low. In an embodiment, the pulse duration of pulse generation block 436 is determined by the RC time constant, where R is equal to 1/gm of transistor 454, and C is the capacitance of MOS gate capacitor 452. When the input IN goes low, switch 450 very quickly charges capacitor 452 to logic supply voltage 460. In alternative embodiments, pulse generation block 436 can be implemented using logically equivalent structures and/or other circuits and methods known in the art.

Figure 9:
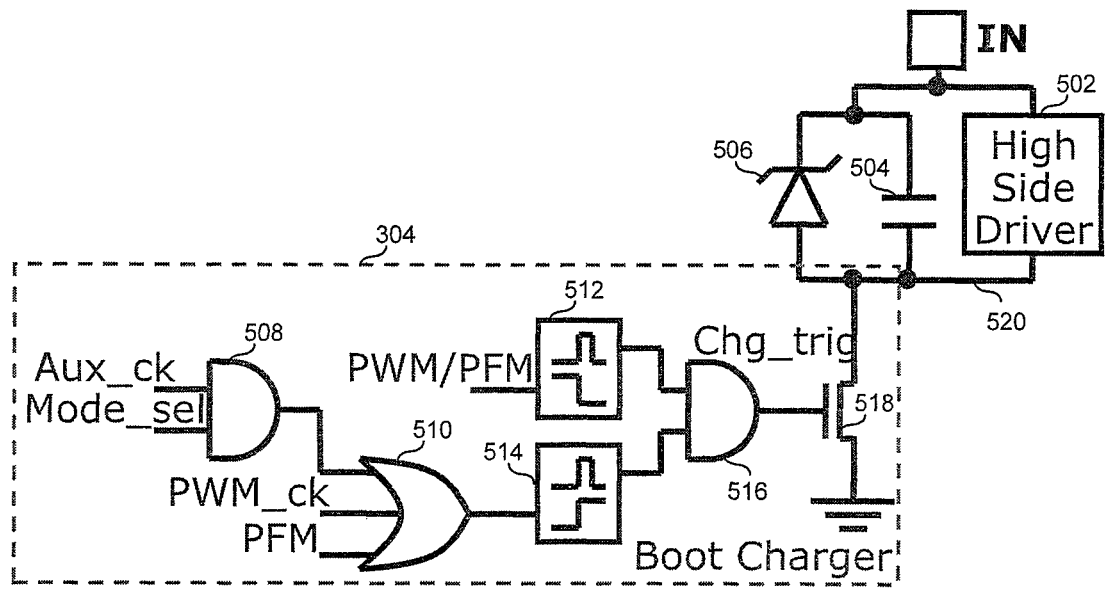
FIG. 9 illustrates an embodiment bootstrap charger circuit.

FIG. 9 illustrates an embodiment implementation of bootstrap charger 304. In an embodiment, bootstrap charger 304 circuit creates a power supply domain referred to the battery line for use by the logic of the level shifter and to provide control signals to switch off the driver circuit. In one embodiment, bootstrap charger has gates 508, 510, and 516, pulse generation circuits 512 and 514, and NMOS switching transistor 518. The output of bootstrap charger 304 is used to pump node 520 below node IN. In the illustrated embodiment, node 520 is pumped to one Zener voltage of diode 506 below node IN. Pumped charge is stored by capacitor 504 and is used to power high side driver 502. In one version of the illustrated embodiment of FIG. 9, there are no resistors that discharge capacitor 504 during the switch off phase of switching transistor 310 (FIG. 4) so bootstrap capacitor 504 is only discharged by leakage. In alternative embodiments, other circuits and methods known in the art can be used to implement bootstrap charger 304.

Figure 10:
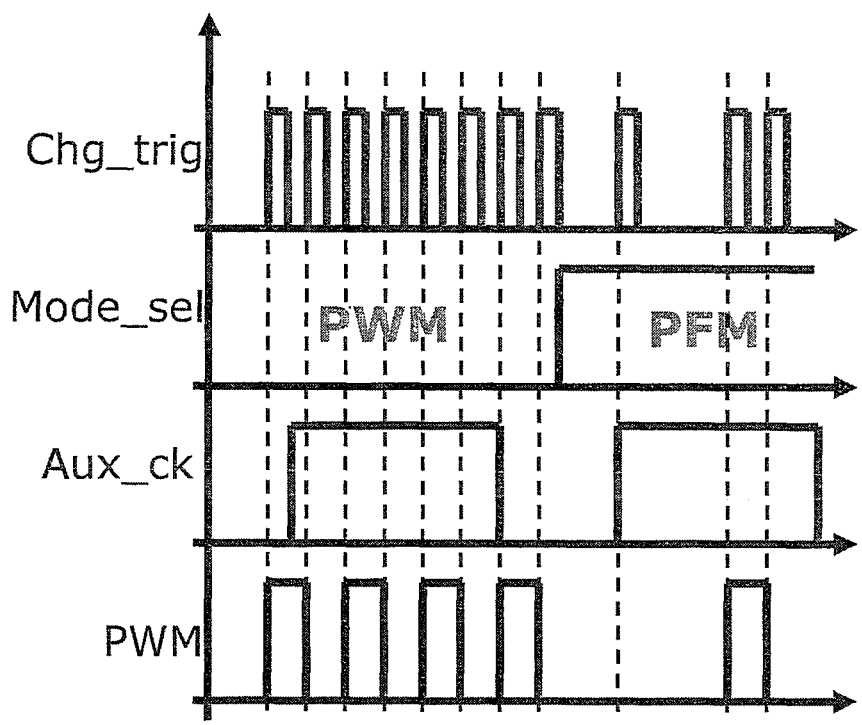
FIG. 10 illustrates a waveform diagram of an embodiment bootstrap charger circuit.

FIG. 10 illustrates a waveform diagram of the operation of embodiment bootstrap charger 304 where both a PWM mode and a PFM mode is implemented. In an embodiment, bootstrap charger 304 is activated at every rising edge of the PWM clock in PWM mode, every rising edge of an auxiliary low freq clock in PFM mode, and every switch off or falling edge of the PWM clock both PWM and PFM modes.

Figure 11:
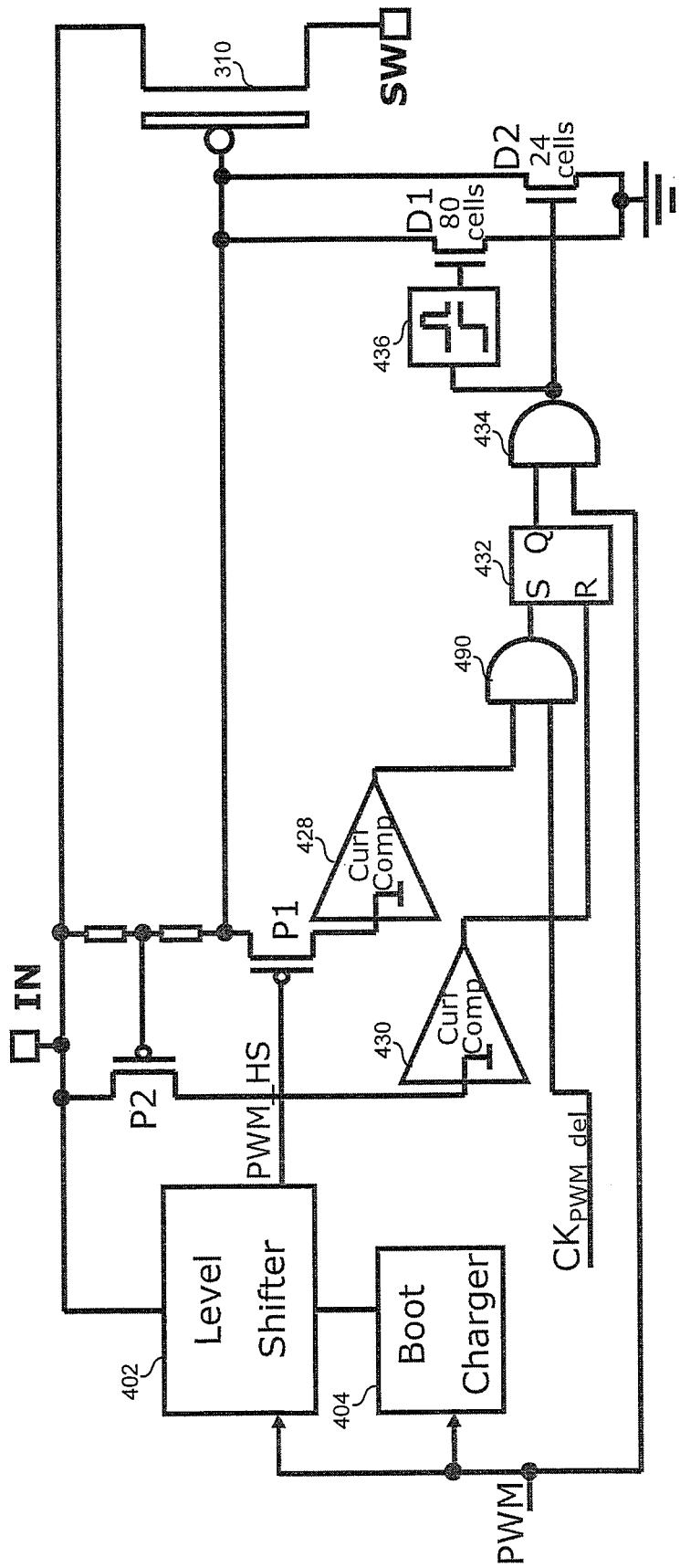
FIG. 11 illustrates an embodiment driver circuit according to a further embodiment.
Figure 12:
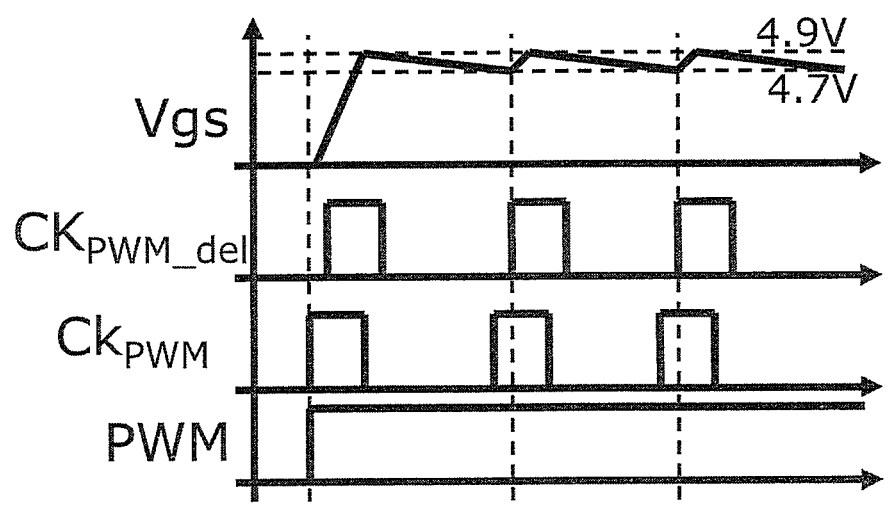
FIG. 12 illustrates a waveform diagram of an embodiment driver circuit operating under a 100% duty cycle condition.

FIG. 11 illustrates an embodiment driver circuit configured to maintain a 100% duty cycle. FIG. 11 is similar to the embodiment of FIG. 7a with the addition of AND gate 490 and input signal $CK_{PWM\_del}$, which is a delayed version of a reference clock that generates the rising edges of the PWM signal. FIG. 12 illustrates a waveform diagram showing the operation of a 100% duty cycle. Signal $CK_{PWM\_del}$ periodically triggers current source transistors D1 and D2 to ensure that the gate of switching transistor 310 remains charged during a 100% duty cycle. Signal $CK_{PWM\_del}$ is i delayed with respect to $CK_{PWM}$ in order to avoid cross conduction with the switch-on phase. $V_{GS}$ monitoring circuitry remains activated to stop charging of the gate of switching transistor 310 whenever a predetermined maximum gate-source voltage is reached. In one embodiment, this voltage is set to about 5V, however, in alternative embodiments, other target voltages can be used.

In an embodiment, to further reduce the power consumption of the driver circuits, in PFM mode, level shifter and 401 and 404 remain active during PFM mode, the remaining circuits such as current comparators 428 and 430, current source transistors D1 and D2, and transistors P1 and P2 remain shut down and are periodically activated prior to an edge of the PWM signal.

An advantage of embodiments of the present invention includes the ability to charge the gate of a switching transistor without using bootstrap cap, apart for a very small buffer cap to help logic circuits to maintain their logic states. From a system point of view, in integrated solutions, eliminating an external bootstrap capacitor saves the component cost of the capacitor and allows less circuit board area to be used in implementing a power supply design. From an integrated circuit point of view, one less pin is required to implement a power supply driver integrated circuit. Using one less pin leads to a cost savings due to the potential ability to use a smaller package, and cost savings in testing because fewer pins need to be tested.

Advantages of embodiments that split the charging phase into two sub-phases include a reduced feedback loop speed requirement, and a lessened effect of dynamic errors in the controlling action of the loop.

Further advantages of embodiments include the ability to charge the gate of a switch both very quick and very accurately. In some embodiments this eliminates the need for specially designed high bandwidth feedback circuits, which can allow for driver implementation in inexpensive and lower speed technologies. Other advantages include less risk in terms of pin failure mode and effects (FMEA) analysis.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of driving a switch transistor, the method comprising:
   activating the switch transistor, wherein the activating comprises:
      charging a control node of the switch transistor at a first charging rate for a first time duration;
      measuring a voltage at the control node of the switching transistor, wherein the measuring comprises converting the voltage at the control node of the switching transistor to a first current; and
      after charging the control node of the switch transistor at the first charging rate, charging the control node of the switch transistor at a second charging rate until the control node of the switch transistor reaches a target signal level, wherein the charging the control node at the second charging rate comprises determining whether the control node has reached the target level based on the measuring by comparing the first current to a reference current, and wherein the second charging rate is less than the first charging rate.

2. The method of claim 1, wherein charging the control node of the of the switch transistor at a first charging rate occurs during a Miller Plateau period of the switch transistor.

3. The method of claim 1, wherein the first time duration is a predetermined time duration.

4. The method of claim 1, further comprising deactivating the switch transistor, deactivating comprises discharging the control node of the switch transistor.

5. The method of claim 1, wherein
   charging the control node of the of the switch transistor at the first charging rate comprises charging the control node with a first charging current; and
   charging the control node of the switch transistor at the second charging rate comprises charging the control node with a second charging current, the second charging current less than the first charging current.

6. The method of claim 1, wherein activating the switch transistor comprises activating a PMOS transistor of a high-side driver.

7. The method of claim 1, further comprising driving the switch transistor with a pulse width modulated signal.

8. The method of claim 7, wherein driving the switch transistor with a pulse width modulated signal comprises activating the switch transistor periodically when a duty cycle of the pulse width modulation signal is 100% or 0%.

9. The method of claim 8, wherein
   activating the switch transistor comprises setting a latch having a set input directly coupled to an output of a comparator via a logic circuit, the logic circuit having a first input coupled to a first input of the logic circuit; and
   activating the switch transistor periodically comprises asserting a first logic signal coupled to a second input of the logic circuit.

10. The method of claim 1, wherein activating the switch transistor comprises setting a latch having a set input directly connected to an output of a comparator.

11. An integrated circuit comprising:
    a switch transistor;
    a variable rate charging circuit configured to be coupled to a control node of the switch transistor, the variable rate charging circuit configured to activate the switch transistor by first charging the control node of the switch transistor at a first charging rate, and then charging the control node of the switch transistor at a second charging rate, the second charging rate less than the first charging rate, wherein the variable rate charging circuit comprises
       a variable current source configured to output a first current when charging the control node at the first charging rate, and a second current when charging the control node at the second charging rate, wherein the first current is greater than the second current, and
       a timer circuit coupled to the variable current source, wherein the timer causes the variable rate charging circuit to output the first current for a predetermined period of time; and
    a controller circuit coupled to the variable rate charging circuit and configured to be coupled to the control node of the switch transistor, the controller circuit configured to
       measure a signal at the control node of the switch transistor,
       determine if the signal at the control node of the switch transistor has reached a predetermined signal level, and
       signal the variable rate charging circuit to stop charging the control node of the switch transistor when the control node of the switch transistor has reached the predetermined signal level.

12. The integrated circuit of claim 11, further comprising a discharge circuit configured to discharge the control node of the switch transistor.

13. The integrated circuit of claim 11, wherein the variable current source comprises a plurality of current sources.

14. The integrated circuit of claim 11, wherein the variable rate charging circuit is configured to drive a high-side PMOS switch transistor, and wherein the control node of the switch transistor comprises a gate of the PMOS switch transistor.

15. The integrated circuit of claim 11, wherein:
    the controller circuit comprises a first comparator having an output directly connected to a set input of a latch; and
    the variable rate charging circuit is coupled to the latch of the controller circuit.

16. The integrated circuit of claim 11, wherein:
    the controller circuit comprises a first comparator having an output coupled to a set input of a latch via a logic circuit, the logic circuit having a first logic input coupled to the output of the first comparator and a second input coupled to a periodic activation signal configured to be asserted when a duty of a voltage of the control node of the switch transistor is about 100%; and the variable rate charging circuit is coupled to the latch of the controller circuit.

17. The integrated circuit of claim 16, wherein:
the latch further comprises a reset input coupled to an output of a second comparator; and
the second comparator is coupled to a reference current circuit comprising a reference current transistor, a first resistor coupled between and ground node and a gate of the reference current transistor, and a second resistor coupled between a reference voltage node and the gate of the reference current transistor.

18. A circuit for driving a high-side switch transistor, the circuit comprising:
an input node for receiving an activation signal;
an output node configured to be coupled to a gate of the switch transistor;
a variable current source coupled to the output node, the variable current source configured to output a first current and a second current, the first current greater than the second current;
a measuring circuit coupled to the output node, the measuring circuit measuring a voltage at the output node; and
a control circuit coupled to the measuring circuit, the control circuit configured to
cause the variable current source to output the first current for a first period of time when the activation signal is asserted,
cause the variable current source to stop outputting the first current after the first period of time has expired and then output the second current,
cause the variable current source to stop outputting the second current after the measuring circuit determines that the output node has reached a target voltage.

19. The circuit of claim 18, wherein the control circuit is further configured to cause the variable current source to stop outputting current when the activation signal is de-asserted.

20. The circuit of claim 18, wherein:
the variable current source comprises a first current source and a second current source; and
the control circuit comprises
a pulse circuit comprising an output coupled to a control terminal of the first current source, the pulse circuit configured to output a pulse of a fixed duration,
a latch comprising
an output coupled to an input of the pulse circuit and a control terminal of the second current source,
a set input coupled to the activation signal, and
a reset input coupled to an output of the measuring circuit.

21. The circuit of claim 18, further comprising the high side switching transistor.

22. The circuit of claim 21, wherein the variable current source, the measuring circuit, the control circuit, and the high-side switching transistor are disposed on a same integrated circuit.

23. The circuit of claim 18, further comprising a level shifter coupled between the input node and the control circuit.

24. The circuit of claim 20, wherein the set input is coupled to the activation signal via a first comparator, wherein the set input is directly connected to an output of the first comparator.

25. The circuit of claim 20, wherein the set input is coupled to the activation signal via a first comparator, wherein the set input is coupled to an output of the first comparator via a logic circuit, the logic circuit having a first logic input coupled to the output of the first comparator and a second input coupled to a periodic activation signal configured to be asserted when a duty of the activation signal is about 100%.

26. A switched-mode power supply comprising:
a high-side driver coupled to a high-side switch transistor, wherein the high side driver is configured to charge a gate of the high-side switch transistor at a first charging rate for a first time duration, and then charge the gate of the high-side switch transistor at a second charging rate until a control node of the high-side switch transistor reaches a target signal level, wherein the first charging rate is faster than the second charging rate, wherein
the high side driver comprises a variable current source coupled to an output of a latch, and
the latch comprises a set input directly connected to an output of a first comparator.

27. The switched-mode power supply of claim 26, further comprising an inductor coupled to a drain of the high-side switch transistor.

28. The switched-mode power supply of claim 26, wherein the high-side switch transistor comprises a PMOS device.

29. A method of driving a switch transistor, the method comprising:
activating the switch transistor, wherein the activating comprises:
charging a control node of the switch transistor at a first charging rate for a first time duration, and
after charging the control node of the switch transistor at the first charging rate, charging the control node of the switch transistor at a second charging rate until the control node of the switch transistor reaches a target signal level, wherein the second charging rate is less than the first charging rate; and
driving the switch transistor with a pulse width modulated signal.

30. The method of claim 29, wherein charging the control node of the of the switch transistor at a first charging rate occurs during a Miller Plateau period of the switch transistor.

31. The method of claim 29, wherein the first time duration is a predetermined time duration.

32. The method of claim 29, further comprising deactivating the switch transistor, deactivating comprises discharging the control node of the switch transistor.

33. The method of claim 29, further comprising:
measuring a voltage at the control node of the switching transistor; and
determining whether the control node has reached the target signal level based on the measuring.

34. The method of claim 33, wherein:
measuring the voltage at the control node of the switching transistor comprises converting the voltage at the control node of the switching transistor to a first current; and
determining whether the control node has reached the target signal level comprises comparing the first current to a reference current.

35. The method of claim 29, wherein
charging the control node of the of the switch transistor at the first charging rate comprises charging the control node with a first charging current; and
charging the control node of the switch transistor at the second charging rate comprises charging the control node with a second charging current, the second charging current less than the first charging current.

36. The method of claim 29, wherein activating the switch transistor comprises activating a PMOS transistor of a high-side driver.

37. The method of claim 29, wherein driving the switch transistor with a pulse width modulated signal comprises activating the switch transistor periodically when a duty cycle of the pulse width modulation signal is 100% or 0%.

38. The method of claim 29, wherein activating the switch transistor comprises setting a latch having a set input directly connected to an output of a comparator.

39. A method of driving a switch transistor, the method comprising:
activating the switch transistor, wherein the activating comprises:
charging a control node of the switch transistor at a first charging rate for a first time duration;
after charging the control node of the switch transistor at the first charging rate, charging the control node of the switch transistor at a second charging rate until the control node of the switch transistor reaches a target signal level, wherein the second charging rate is less than the first charging rate; and
setting a latch having a set input directly connected to an output of a comparator.

40. The method of claim 39, wherein charging the control node of the of the switch transistor at a first charging rate occurs during a Miller Plateau period of the switch transistor.

41. The method of claim 39, wherein the first time duration is a predetermined time duration.

42. The method of claim 39, further comprising deactivating the switch transistor, deactivating comprises discharging the control node of the switch transistor.

43. The method of claim 39, further comprising:
measuring a voltage at the control node of the switching transistor; and
determining whether the control node has reached the target signal level based on the measuring.

44. The method of claim 43, wherein:
measuring the voltage at the control node of the switching transistor comprises converting the voltage at the control node of the switching transistor to a first current; and
determining whether the control node has reached the target signal level comprises comparing the first current to a reference current.

45. The method of claim 39, wherein
charging the control node of the of the switch transistor at the first charging rate comprises charging the control node with a first charging current; and
charging the control node of the switch transistor at the second charging rate comprises charging the control node with a second charging current, the second charging current less than the first charging current.

46. The method of claim 39, wherein activating the switch transistor comprises activating a PMOS transistor of a high-side driver.

47. The method of claim 39, further comprising driving the switch transistor with a pulse width modulated signal.

48. The method of claim 47, wherein driving the switch transistor with a pulse width modulated signal comprises activating the switch transistor periodically when a duty cycle of the pulse width modulation signal is 100% or 0%.

49. A switched-mode power supply comprising:
a high-side driver coupled to a high-side switch transistor, wherein
the high side driver is configured to charge a gate of the high-side switch transistor at a first charging rate for a first time duration, and then charge the gate of the high-side switch transistor at a second charging rate until a control node of the high-side switch transistor reaches a target signal level,
the first charging rate is faster than the second charging rate,
the high side driver comprises a variable current source coupled to an output of a latch, and
the latch comprises a set input coupled to an output of a first comparator via a logic circuit, the logic circuit having a first logic input coupled to the output of the first comparator and a second input coupled to a periodic activation signal configured to be asserted when a duty of the high side switch driver is about 100%.

50. The switched-mode power supply of claim 49, further comprising an inductor coupled to a drain of the high-side switch transistor.

51. The switched-mode power supply of claim 49, wherein the high-side switch transistor comprises a PMOS device.

* * * * *

UNITED STATES PATENT AND TRADEMARK OFFICE
CERTIFICATE OF CORRECTION

PATENT NO. : 8,497,714 B2  
APPLICATION NO. : 13/007347  
DATED : July 30, 2013  
INVENTOR(S) : Garbossa et al.

Page 1 of 1

It is certified that error appears in the above-identified patent and that said Letters Patent is hereby corrected as shown below:

In the Claims:

In Col. 9, line 56, claim 5, delete "of the of the" and insert --of the--.
In Col. 12, line 38, claim 30, delete "of the of the" and insert --of the--.
In Col. 12, line 58, claim 35, delete "of the of the" and insert --of the--.
In Col. 13, line 23, claim 40, delete "of the of the" and insert --of the--.

Signed and Sealed this  
Fifteenth Day of October, 2013

Teresa Stanek Rea  
*Deputy Director of the United States Patent and Trademark Office*